US012811408B2

(12) United States Patent
Voller

(10) Patent No.: US 12,811,408 B2
(45) Date of Patent: Nov. 24, 2026

(54) ELECTRICAL ENERGY DISPENSING SYSTEM

(71) Applicant: Oxcion Limited, Abingdon (GB)

(72) Inventor: Stephen David Voller, Oxford (GB)

(73) Assignee: Oxcion Limited, Abingdon (GB)

( * ) Notice: Subject to any disclaimer, the term of this patent is extended or adjusted under 35 U.S.C. 154(b) by 0 days.

(21) Appl. No.: 18/476,262

(22) Filed: Sep. 27, 2023

(65) Prior Publication Data

US 2024/0022081 A1 Jan. 18, 2024

Related U.S. Application Data

(63) Continuation of application No. 17/040,492, filed as application No. PCT/GB2019/050777 on Mar. 20, 2019, now Pat. No. 11,777,317.

(30) Foreign Application Priority Data

Mar. 23, 2018 (GB) ..................................... 1804707

(51) Int. Cl.
*H02J 3/38* (2006.01)
*B60L 50/40* (2019.01)
(Continued)

(52) U.S. Cl.
CPC .............. *H02J 3/381* (2013.01); *B60L 50/40* (2019.02); *B60L 50/64* (2019.02); *B60L 53/16* (2019.02);
(Continued)

(58) Field of Classification Search
CPC ........ H02J 3/381; H02J 7/0042; H02J 7/0047; H02J 7/345; H02J 2300/28; H02J 2207/50;
(Continued)

(56) References Cited

U.S. PATENT DOCUMENTS 6,222,723 B1 4/2001 Razoumov et al.
9,040,182 B2 5/2015 Aihara et al.
(Continued)

FOREIGN PATENT DOCUMENTS

CN 204131153 U * 1/2015
EP 2620315 A2 7/2013
(Continued)

*Primary Examiner* — Alex W Lam
(74) *Attorney, Agent, or Firm* — Hodgson Russ LLP

(57) ABSTRACT

A system for delivering electrical energy to a chargeable unit of an electrically powered object characterised by comprising: at least one input line for delivering electricity from a grid and/or a source of renewable electrical energy; optionally a first converter disposed within the input line(s) for converting alternating current to direct current; at least one reservoir of electrical energy connected to the input line(s) and including (a) a plurality of supercapacitors arranged in series or parallel and (b) a means for delivering an output voltage and current therefrom; at least one second converter adapted to step-up or down the output voltage from the reservoir(s) to a charging voltage of the chargeable unit and, at least one dispensing means connected to the systems and adapted to cooperate with a corresponding connector means on the object to enable the charging voltage to charge the chargeable unit.

20 Claims, 5 Drawing Sheets

(51) Int. Cl.

| | |
|---|---|
| ***B60L 50/64*** | (2019.01) |
| ***B60L 53/16*** | (2019.01) |
| ***B60L 53/51*** | (2019.01) |
| ***B60L 53/52*** | (2019.01) |
| ***B60L 53/60*** | (2019.01) |
| ***B60L 58/12*** | (2019.01) |
| ***H02J 7/00*** | (2006.01) |
| ***H02J 7/34*** | (2006.01) |
| ***H02J 7/70*** | (2026.01) |
| ***H02J 7/80*** | (2026.01) |
| ***H02J 101/22*** | (2026.01) |
| ***H02J 101/28*** | (2026.01) |

(52) U.S. Cl.
CPC ............... *B60L 53/51* (2019.02); *B60L 53/52* (2019.02); *B60L 53/60* (2019.02); *B60L 58/12* (2019.02); *H02J 7/0042* (2013.01); *H02J 7/0047* (2013.01); *H02J 7/345* (2013.01); *H02J 2207/50* (2020.01); *H02J 2300/22* (2020.01); *H02J 2300/28* (2020.01)

(58) Field of Classification Search
CPC ...... H02J 2300/22; H02J 2207/40; H02J 7/34; H02J 7/342; H02J 3/38; H02J 3/32; B60L 53/60; B60L 53/51; B60L 50/64; B60L 58/12; B60L 53/16; B60L 53/52; B60L 50/40; B60L 53/55; Y02T 90/14; Y02T 90/12; Y02T 10/7072; Y02T 10/70
See application file for complete search history.

(56) References Cited

U.S. PATENT DOCUMENTS

| | | | | |
|---|---|---|---|---|
| 11,196,097 | B2 * | 12/2021 | Gu | H01M 10/0525 |
| 2006/0183016 | A1 * | 8/2006 | Kazacos | B60L 50/64 429/105 |
| 2010/0026248 | A1 | 2/2010 | Barrade et al. | |
| 2011/0248683 | A1 | 10/2011 | Young et al. | |
| 2011/0291611 | A1 | 12/2011 | Manor | |
| 2012/0164508 | A1 * | 6/2012 | Houchin-Miller | H01M 10/617 429/120 |
| 2012/0223679 | A1 | 9/2012 | Iwai et al. | |
| 2014/0046567 | A1 | 2/2014 | Schuler | |
| 2016/0006249 | A1 * | 1/2016 | Sala | H02J 3/32 307/20 |
| 2016/0121735 | A1 | 5/2016 | Sugano | |
| 2016/0141900 | A1 * | 5/2016 | Voller | H02J 7/342 320/114 |
| 2016/0172868 | A1 | 6/2016 | Sequeira et al. | |
| 2016/0327007 | A1 | 11/2016 | Averbukh et al. | |
| 2018/0019070 | A1 * | 1/2018 | Chai | C01B 19/04 |
| 2018/0029481 | A1 * | 2/2018 | Mashinsky | B60L 53/65 |

FOREIGN PATENT DOCUMENTS

| | | | |
|---|---|---|---|
| JP | H07-226232 | A | 8/1995 |
| JP | 2015-155243 | A | 8/2015 |
| WO | 2015/075203 | A1 | 5/2015 |
| WO | 2015/092886 | A1 | 6/2015 |
| WO | 2016/209378 | A2 | 12/2016 |

* cited by examiner

ELECTRICAL ENERGY DISPENSING SYSTEM

CROSS-REFERENCE TO RELATED APPLICATIONS

This application is a continuation of U.S. patent application Ser. No. 17/040,492, filed on Sep. 22, 2020, which is a National Phase entry of PCT/GB2019/050777, filed on Mar. 20, 2019, which claims priority to GB 1804707.6, filed on Mar. 23, 2018, the disclosures of each of which are incorporated herein by reference in their entirety.

BACKGROUND

The present invention relates to a system for dispensing electrical energy to a chargeable unit (e.g. a battery or supercapacitor) of an electrically powered object.

EP 2620315 describes utilising energy storage on a high voltage link capacitor to discharge into a high voltage battery using rectification a direct current to direct current conversion apparatus conversion apparatus. This is quite different from the system we describe herein.

US20100026248 discloses an apparatus for rapidly transferring electrical energy from a supercapacitor-based charging unit to a portable electronic device powered by a second supercapacitor but does not teach an integrated system of the type described below.

SUMMARY

Accordingly, there is provided a system for delivering electrical energy to a chargeable unit of an electrically powered object characterised by comprising:

- at least one input line for delivering electricity from a grid and/or a source of renewable electrical energy;
- optionally a first converter disposed within the input line(s) for converting alternating current to direct current;
- at least one reservoir of electrical energy connected to the input line(s) and including (a) a plurality of supercapacitors arranged in series or parallel and (b) a means for delivering an output voltage and current therefrom;
- at least one second converter adapted to step-up or down the output voltage from the reservoir(s) to a charging voltage of the chargeable unit and
- at least one dispensing means connected to the system and adapted to cooperate with a corresponding connector means on the object to enable the charging voltage to charge the chargeable unit.

DETAILED DESCRIPTION

Figure 1:
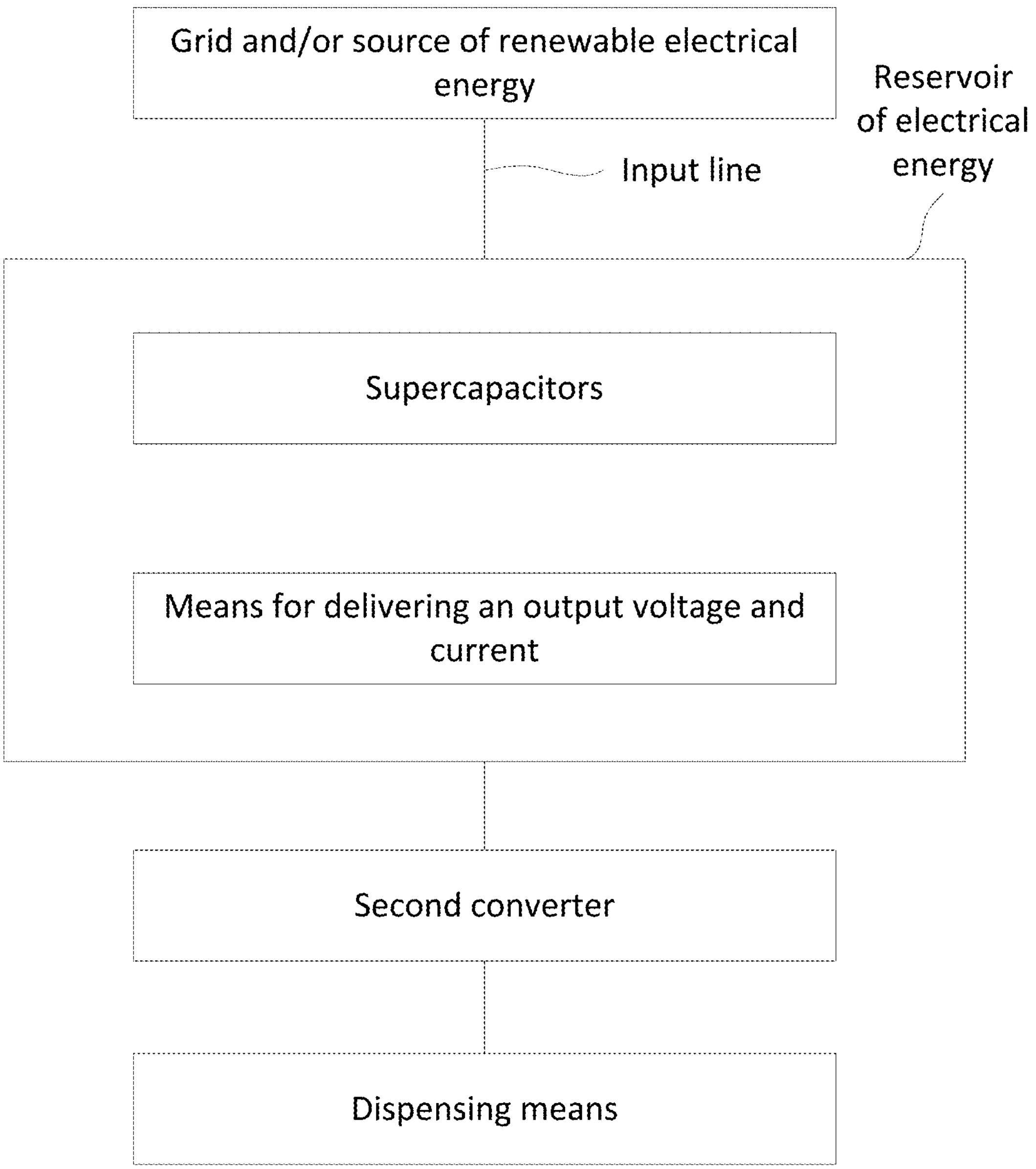
FIG. 1 is a high-level diagram of a system according to an embodiment of the disclosure.
Figure 2:
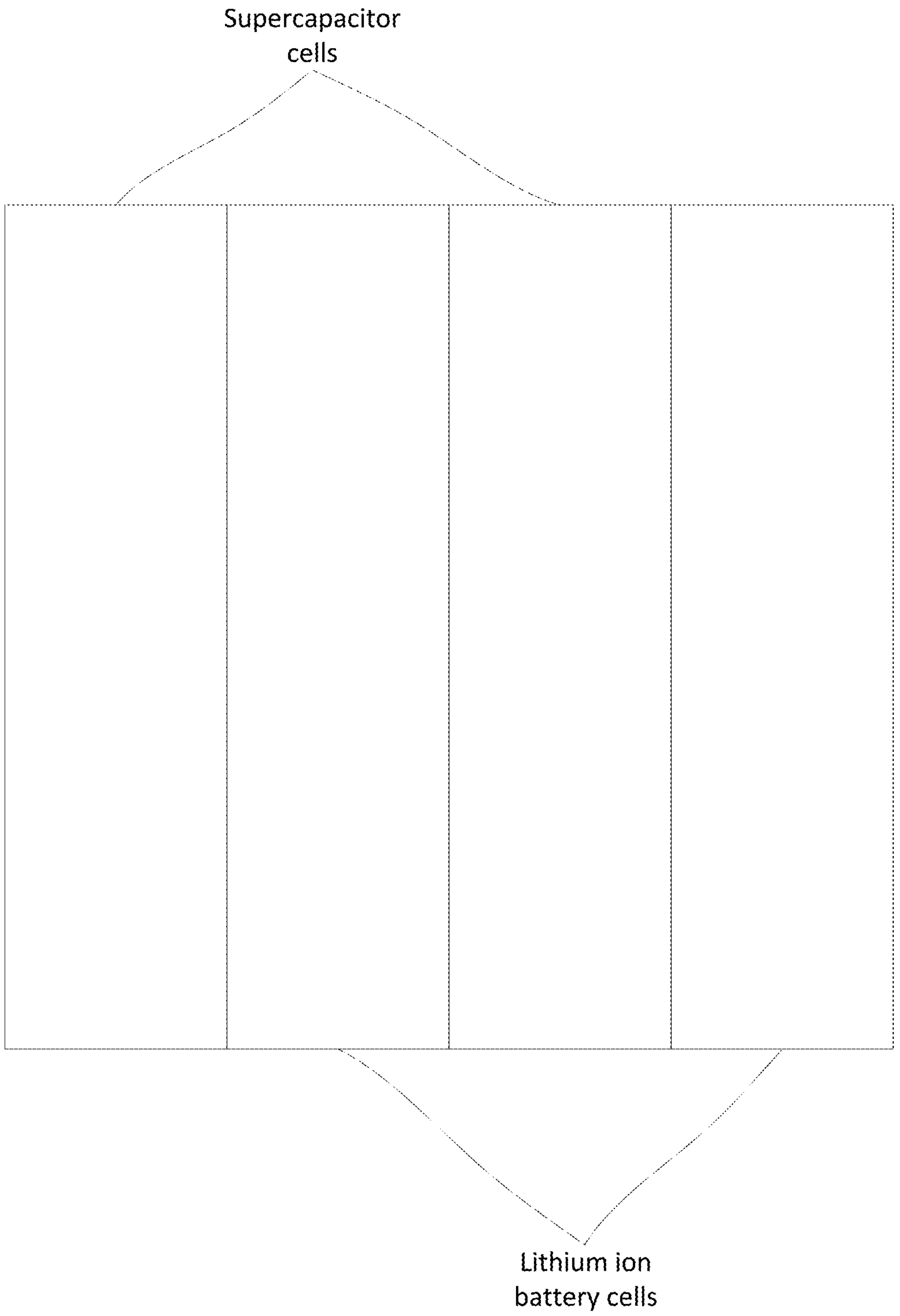
FIG. 2 is a diagram of interleaved cells.
Figure 3:
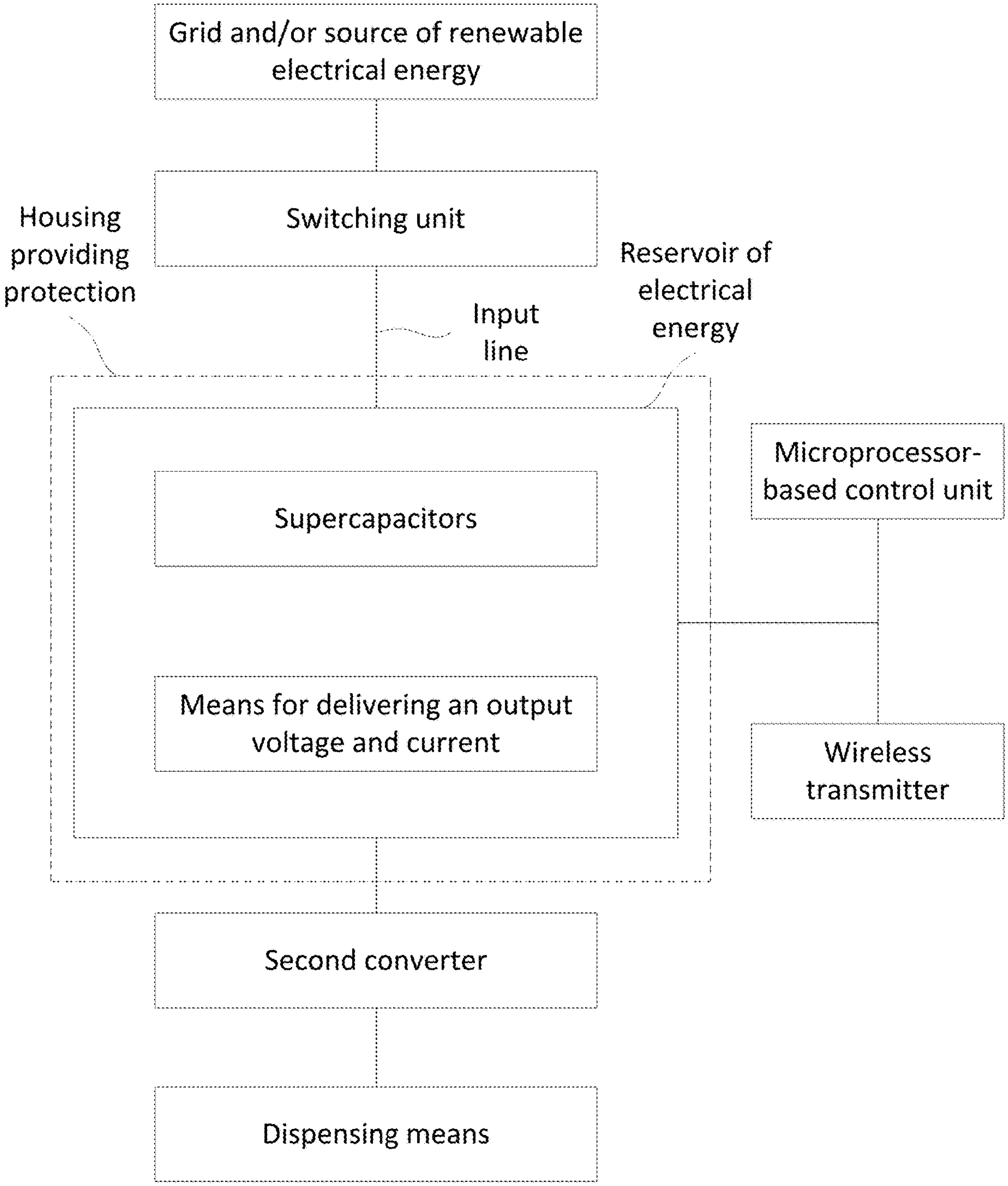
FIG. 3 is a diagram of a system according to another embodiment of the disclosure.
Figure 4:
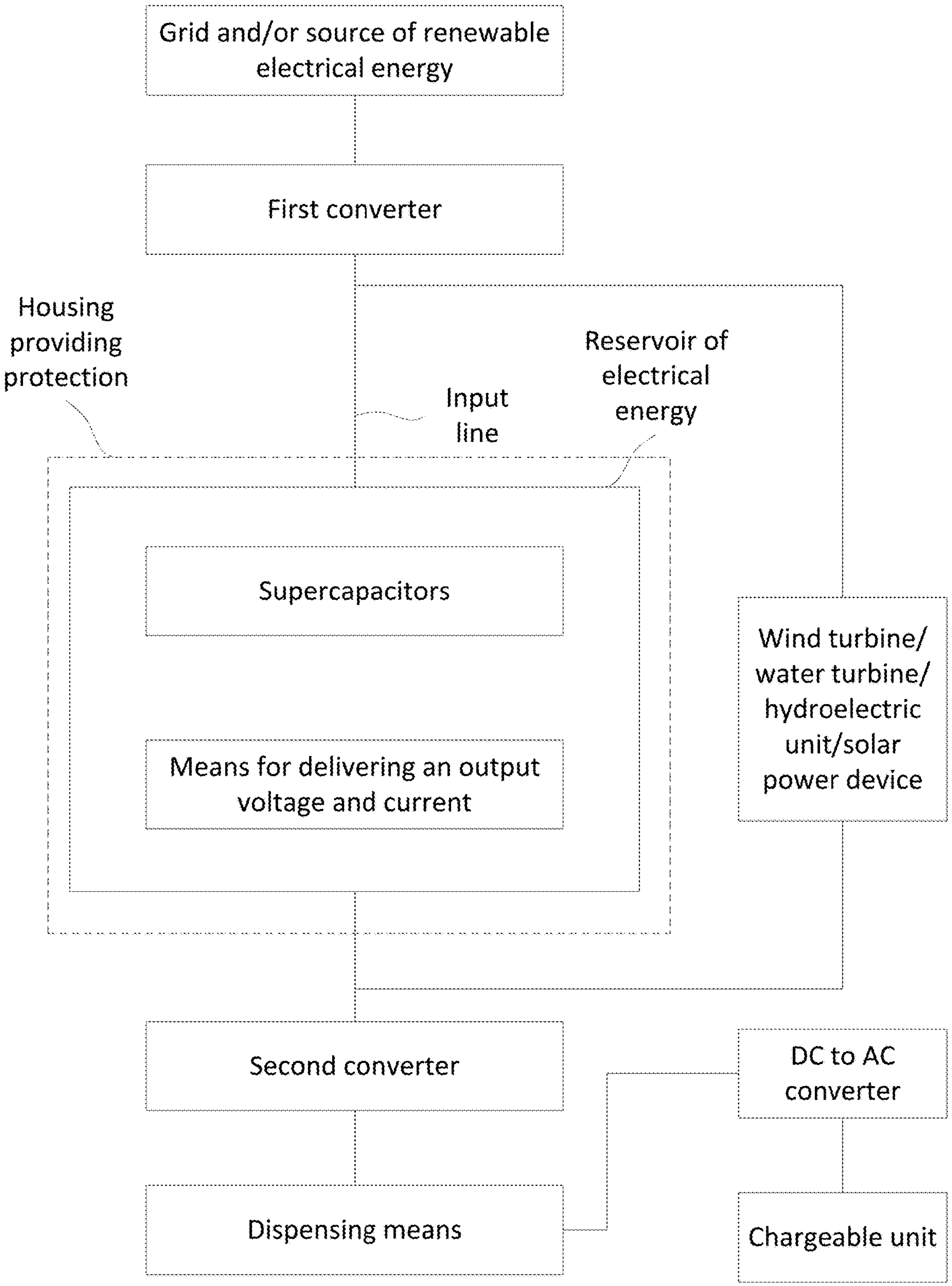
FIG. 4 is a diagram of a system according to another embodiment of the disclosure.
Figure 5:
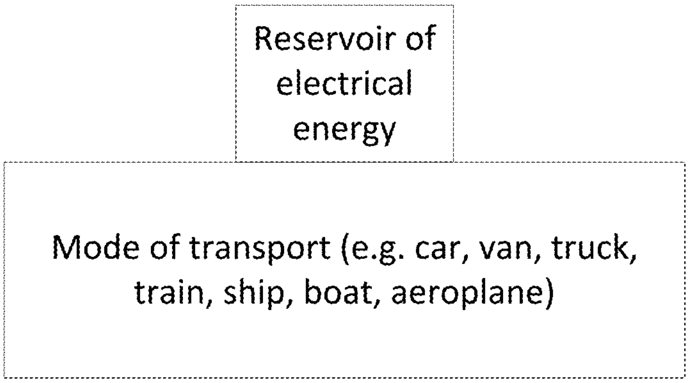
FIG. 5 is a diagram showing the reservoir mounted on a mode of transport.

In one embodiment, the system is made manifest as a vehicle or robot service-station wherein the reservoir comprising the plurality of supercapacitors is disposed within a housing such as a metal box or the like which protects the reservoir from its surrounding environment. It may be water-tight and optionally air-tight. In another, the housing is disposed in a secure location; for example, underground; optionally with inspection or maintenance hatches which may be accessed by a service engineer or like knowledgeable person. In another embodiment, the housing is filled with an inert gas such as nitrogen to blanket the reservoir and thereby minimise the risk of fire damage. This may be particularly important where the reservoir is housed alongside, for example, a lithium Ion battery reservoir. In yet another embodiment, the reservoir may be mounted on or within a vehicle such as a car, van, truck, train, ship or aeroplane for the purpose of delivering energy as a mobile reservoir between a source and user which are remote from each other.

In one embodiment, the input line is connected to existing physical infrastructure providing electricity such as a national or local electrical grid; for example, of the type routinely used to deliver electricity to domestic households, offices or industrial plant. Where supercapacitors are used in this kind of setting, the supercapacitor reservoir can be used to upgrade the power rating of the input line in order to provide fast charging for automobiles and the like. For example, an input line which is only rated to provide 50 kW charging can be easily uprated to provide 350 kW 700 kW, 1000 kW or even greater power and thus shorter re-charging times. In another embodiment, the input line is alternatively or additionally connected to a stand-alone source of green electricity generated by harvesting a source of renewable energy. Examples of this type include but are not limited to wind turbines, wave-turbines, hydroelectric plants and solar energy collectors. In the case of wind turbines and other variable power generating assets such as renewables, it may be beneficial to receive electrical energy at high power and then deliver that energy to the grid at low power. By way of example, a wind turbine may produce electrical energy at 900 kW which is possible to capture in a supercapacitor reservoir for later distribution to the grid at less than 150 kW. This flexibility can simplify the infrastructure for such assets. In yet another embodiment, the source of renewable energy is one which is integral with the system of the invention and is either co-located with it or deployed nearby.

In one embodiment, the source of renewable energy is used in association with an input line which is also connected to a grid thereby allowing electrical energy derived therefrom to be diverted into the grid by means of a switching unit in instances where the reservoir(s) are fully charged but the renewable energy source is still generating electricity. This switching unit may also be adapted to allow electricity from the reservoir to be returned to the grid for top-up purposes in times when demand on the grid is high. The reservoir may, in this way, be used for energy arbitrage where a differential in-peak and off-peak price exists. By this means, a plurality of the systems of the present invention may be disposed at various locations to create a distributed means of electrical energy storage; enabling the grid itself to better manage demands made on it by consumers.

Where the electricity is generated by solar panels, these panels may be located at any convenient location. For example, in the case of a service station in an adjacent zone especially reserved for them. Alternatively, they may be made integral with those buildings associated with the system; for example, a domestic house or retail building such as a vehicle service station. In this latter respect, the system may be for example located at conventional service stations dispensing conventional hydrocarbon fuels, or futuristic fuels such as hydrogen or ammonia. The intrinsic safety of a reservoir containing cells with non-flammable electrolytes (such as is described below) is of especial benefit where high-pressure hydrogen gas is being dispensed for fuel purposes at the same installation.

Upstream of the reservoir, there may optionally be disposed within the input line a first converter for converting alternating current from the grid and/or a turbine-based source of renewable energy to direct current. Where the renewable energy source is direct current (for example from a solar panel), the first converter may be dispensed with altogether. Any of the conventional types of current converter may be employed provided that they are rated for the duty required of them.

The supercapacitors which are employed in the reservoir may be in principle of any type which are able to receive, hold and dispense a significant amount of electrical charge on a cyclical recharging basis. In this respect, there are many such options available on the market which may be scaled in size to meet to the requirements of the system. In one preferred embodiment, the supercapacitors may comprise cells which include as their key components carbon electrodes (optionally including nanocarbon-conducting components such as graphene, graphitic carbon and/or carbon nanotubes); an ionic liquid electrolyte (e.g. the salt of a heterocyclic nitrogen or phosphorous base) which non-flammable and an intermediate ion-permeable polymer membrane. For further information as to suitable constituent parts for such supercapacitors, attention is drawn to those supercapacitor cells described in GB2532246 developed for use with battery-chargers; although reference to this particular type of cell should not be construed as limiting.

In one alternative embodiment, the reservoir may be comprised of at least one lithium ion battery cell and at least one supercapacitor cell employing a non-flammable electrolyte in arrangement where these components are interleaved with one another. The reservoir may also include arrangements to heat or cool the cells contained within it in order to mitigate the effects of low temperatures or improve performance or lifetime through cooling. These may comprise electrical heaters or fan-based air-conditioning units.

Each reservoir is connected to at least one dispensing means designed to cooperate and form an electrical pathway with a corresponding connector means on the object to be charged; for example, an automobile, robot or the like. For example, the dispensing means and connector can together comprise a pin-plug and socket arrangement. By this means, the chargeable unit of the object can be charged. In one embodiment, the chargeable unit includes or is comprised of one or more lithium-ion battery. In another embodiment, the chargeable unit includes or is comprised of one or more supercapacitors. In yet another embodiment, the chargeable unit is a hybrid comprised of at least one lithium-ion battery and at least one supercapacitor. In one preferred embodiment, the chargeable unit comprises a component or part of an electrically-powered automobile. In another preferred embodiment, the chargeable unit comprises part of the infrastructure required to charge an electrically-powered automobile.

Arranged between the reservoir and each dispensing means is a second converter to ensure that the reservoir output is tailored to meet the end user requirements. This second converter may comprise one or more transformers, current converters, inverters, energy controllers, battery management systems and the like. In one embodiment, a DC-DC converter designed to step up or down the DC voltage output of the reservoir to a level compatible with the object's charging requirement is employed. For example, in the case of an automobile, this will typically require a voltage conversion into the range of many hundreds of volts; for example, in the range 250-1500 volts, 250-350 volts, 750-1500 volts or preferably 350-750 volts. In another embodiment, an inverter may be used to convert the DC output of the reservoir to an AC input to an object being charged. Alternatively or additionally, the individual energy storing elements of the reservoir can be arranged in series thus raising the voltage of the reservoir output.

The system may optionally also include a microprocessor-based control unit for managing and reporting the charging status of the reservoir and/or for the detection of faults. It may also include a wireless transmitter for transmitting such information to a remote location either within the system itself or for example to users wishing to access the system; for example, motorists seeking a service station which is ready and able to dispense the required amount of electricity. The system may also be in contact with energy markets or suppliers in order to determine which price to offer the consumer. Multiple prices may be offered by the system to the consumer for differential prioritisation in terms of 'queue skipping' or charging speed.

A modular system according to the present invention can be constructed as follows:

Supercapacitor cells of the type described in our previous application EP3427281 and composed of nanocarbon-containing anodes and cathodes and an ionic liquid electrolyte are prepared. Each cell has a maximum stored energy capacity which is achieved at its maximum voltage. Cells may be charged and discharged between 0V and this maximum voltage. In order to ensure lifetimes of hundreds of thousands or millions of cycles for all cells, they are most preferably charged and discharged over a limited voltage range. This voltage range may, by way of example, be between 10% and 90% of the maximum voltage. Output currents equivalent to between 0.5C and 100C are possible where C is the current required to fully discharge the system in 1 hour. A system for charging vehicles at 350 kW may, for example, be charged and discharged at between 3C and 10C.

Packs of such cells are connected in parallel with one another to produce an intermediate power pack having a substantially reduced impedance and thus improved power delivery over the same voltage range as an individual cell. The pack has an output current of equivalent to the cell output current multiplied by the number of cells in the pack.

Such packs are connected in series to create a module having the cumulative stored energy capacity of the packs over the cumulative voltage range of the packs. Such modules have the same output current as an individual pack.

Modules are arranged in series in a rack assembly to produce a secondary power unit having the cumulative stored energy capacity of the modules operating over the cumulative voltage range of the modules contained. Such secondary power units have an output current the same as the packs and modules contained.

The secondary power units are connected in parallel to produce a primary power unit having the cumulative stored energy capacity of the secondary power units contained operating over the same voltage range as the secondary power units. The operating current is the cumulative total for the secondary power units.

The primary power units are arranged in such a way as to provide the optimum input to an energy delivery system, for example a vehicle charger. This may be in the form of a 'string' of such units arranged in series.

Primary power units may then be connected and configured according to the requirements of a wider installation; for example, an automobile service station.

The modular system described above can be configured to give a wide range of output conditions for a wide range of installation sizes. This provides benefits in terms of flexibility and applicability to a wide range of applications such as (but not limited to) automotive charging, grid level peak-shaving, load-levelling, attenuating the output of renewable electricity generation assets, remote energy delivery and the like. It can also be configured to give the same output from a wide range of input conditions allowing customer experience to be unaffected by the way that the input energy is generated and transmitted to the system.

The invention claimed is:

1. A system for storing electrical energy characterised by comprising:

at least one reservoir of electrical energy connected to an input line and including:

(a) a plurality of supercapacitor cells arranged in series or parallel, the plurality of supercapacitor cells employing a non-flammable electrolyte; and (b) a means for delivering an output voltage and current therefrom;

wherein the reservoir further comprises one or more lithium ion battery cells; and wherein said lithium ion battery cells and said supercapacitor cells are interleaved with one another.

2. The system as claimed in claim 1 characterised in that the system further comprises a switching unit located upstream of the reservoir to enable electrical energy stored in the reservoir to be delivered to a grid.

3. The system as claimed in claim 1 characterised in that the supercapacitors are comprised of carbon electrodes, an ionic liquid electrolyte and an intermediate ion-permeable polymer membrane.

4. The system as claimed in claim 1 characterised in that the reservoir is located in a housing providing protection from the external environment which housing is optionally located underground, water-tight and/or air-tight.

5. The system as claimed in claim 4 characterised that the housing also contains an inert or non-flammable gas to blanket the reservoir.

6. The system as claimed in claim 1 characterised by further comprising a wireless transmitter for transmitting information to locations with the system or to an external user.

7. The system as claimed in claim 1 characterised by further comprising one or more of a wind turbine, a water turbine, a hydroelectric unit or a solar power device.

8. The system as claimed in claim 1 characterised in that the reservoir can be moved to deliver energy at a remote location.

9. The system as claimed in claim 8 characterised in that the reservoir is mounted on a car, van, truck, train, ship, boat, aeroplane or other mode of transport.

10. The system as claimed in claim 1 characterised in that an inverter is used to convert a DC output from the reservoir to an AC input to a chargeable unit.

11. The system as claimed in claim 1 characterised by providing input to a chargeable unit capable of producing a 350 KW or more output.

12. The system as claimed in claim 11 characterised in providing the input to a chargeable unit capable of producing a 1000 kW output.

13. The system as claimed in claim 1 characterised by comprising at least one dispensing means connected to the system and adapted to cooperate with a corresponding connector means on an electrically powered object to enable the charging voltage to charge a charging unit of the electrically powered object.

14. The system as claimed in claim 1 characterised by comprising a first converter attached to the input line(s) for converting alternating current to direct current.

15. The system as claimed in claim 1 characterised by comprising at least one input line for delivering electricity from a grid and/or a source of renewable electrical energy.

16. The system as claimed in claim 15 characterised in that the power output from the system is higher than an input power from the grid and/or the source of renewable energy.

17. The system as claimed in claim 1 characterised by comprising at least one second converter adapted to step-up or down the output voltage from the reservoir(s) to a charging voltage of the chargeable unit.

18. The system as claimed in claim 17 characterised in that the second converter is used to regulate the output voltage of the reservoir to a direct current voltage in the range 250-1500V.

19. The system as claimed in claim 1, wherein the reservoir comprises an arrangement to heat the cells within the reservoir.

20. The system as claimed in claim 1, wherein the reservoir comprises an arrangement to cool the cells within the reservoir.

* * * * *